(12) United States Patent
Watanabe et al.

(10) Patent No.: US 9,906,729 B2
(45) Date of Patent: Feb. 27, 2018

(54) IMAGING APPARATUS AND MICROSCOPE SYSTEM

(71) Applicant: OLYMPUS CORPORATION, Tokyo (JP)

(72) Inventors: Nobuyuki Watanabe, Yokohama (JP); Hiroyuki Fukuda, Hachioji (JP); Yoko Abe, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 314 days.

(21) Appl. No.: 14/725,313

(22) Filed: May 29, 2015

(65) Prior Publication Data

US 2015/0264270 A1 Sep. 17, 2015

Related U.S. Application Data

(63) Continuation of application No. PCT/JP2013/075169, filed on Sep. 18, 2013.

(30) Foreign Application Priority Data

Dec. 7, 2012 (JP) .................. 2012-268787

(51) Int. Cl.
*H04N 9/47* (2006.01)
*H04N 7/18* (2006.01)
(Continued)

(52) U.S. Cl.
CPC ......... *H04N 5/23296* (2013.01); *G02B 21/06* (2013.01); *G02B 21/365* (2013.01);
(Continued)

(58) Field of Classification Search
CPC ................................................. H04N 5/23296
See application file for complete search history.

(56) References Cited

U.S. PATENT DOCUMENTS 5,880,844 A * 3/1999 Seng .................. G01B 11/026
356/613
8,000,560 B2 8/2011 Shirota
(Continued)

FOREIGN PATENT DOCUMENTS

JP H11-211439 A 8/1999
JP 2008-191427 A 8/2008
(Continued)

OTHER PUBLICATIONS

International Search Report dated Dec. 24, 2013 issued in PCT/JP2013/075169.

*Primary Examiner* — Hung Dang
*Assistant Examiner* — Girumsew Wendmagegn
(74) *Attorney, Agent, or Firm* — Scully, Scott, Murphy & Presser, P.C.

(57) ABSTRACT

An imaging apparatus includes: a stage on which an object is configured to be placed; an imaging unit having an imager configured to image the object; a movement mechanism configured to perform a relative movement between the stage and the imaging unit in at least one direction within a placement plane for placing the object; a tilt mechanism configured to tilt at least one of an imaging surface of the imager and the stage relative to a moving direction of the movement mechanism; and a tilt angle setting unit configured to set a tilt angle of the tilt mechanism based on at least a magnification of the imaging unit and a size of an effective area on the imaging surface, the effective area being an area into which observation light from the object is introduced.

18 Claims, 15 Drawing Sheets

(51) Int. Cl.
  *H04N 5/232* (2006.01)
  *G02B 21/36* (2006.01)
  *G02B 21/06* (2006.01)
  *G06T 3/40* (2006.01)
(52) U.S. Cl.
  CPC ....... G06T 3/4038 (2013.01); H04N 5/23238 (2013.01); *G06T 2207/10056* (2013.01)

(56) References Cited

U.S. PATENT DOCUMENTS

| | | |
|---|---|---|
| 8,422,127 B2 | 4/2013 | Uchiyama et al. |
| 2011/0207056 A1* | 8/2011 | Pierrat .................. B82Y 10/00 430/319 |
| 2013/0084390 A1 | 4/2013 | Suzuki et al. |
| 2014/0231638 A1* | 8/2014 | Damaskinos .......... B82Y 35/00 250/234 |

FOREIGN PATENT DOCUMENTS

| | | |
|---|---|---|
| WO | WO 2006/098443 A1 | 9/2006 |
| WO | WO 2008/137746 A1 | 11/2008 |
| WO | WO 2011/080670 A1 | 7/2011 |
| WO | WO 2012-159205 A1 | 11/2012 |

\* cited by examiner

IMAGING APPARATUS AND MICROSCOPE SYSTEM

CROSS REFERENCE TO RELATED APPLICATIONS

This application is a continuation of PCT international application Ser. No. PCT/JP2013/075169 filed on Sep. 18, 2013 which designates the United States, incorporated herein by reference, and which claims the benefit of priority from Japanese Patent Application No. 2012-268787, filed on Dec. 7, 2012, incorporated herein by reference.

BACKGROUND

1. Technical Field

The disclosure relates to an imaging apparatus and a microscope system for imaging an object to acquire an image, and particularly, to an imaging apparatus and a microscope system for imaging a sliced specimen.

2. Related Art

In recent years, an electronic imaging technique has progressed in the technical field of microscopic observation, and there has been proposed a system which displays a single image with a wide range and high definition by stitching a plurality of images obtained by imaging a plurality of regions within an object as an observation target. Such a system is also called a virtual slide system. For example, Japanese Laid-open Patent Publication No. 2008-191427 discloses a technique for dividing an observed region of a living tissue into small sections and connecting images acquired by imaging in each of the small sections in pathological diagnosis support.

In such an imaging technique, the number of times of performing imaging increases corresponding to the number of small sections. Thus, there is a need to increase the speed of an imaging operation. The increase in the imaging speed involves how to increase the speed of autofocus when imaging the small sections.

On the other hand, there has also been developed a technique for three-dimensionally displaying an object by extracting a confocal point from a plurality of images of the object observed with a microscope. However, in a confocal microscope, it takes a long time in the operation since an optical system such as an objective lens should be operated in the optical axis direction (Z direction) for changing a confocal plane.

In view of such a situation, Japanese Laid-open Patent Publication No. 11-211439 discloses a technique of focus-free imaging by moving the stage with tiling a focal plane on an object with respect to a moving direction (e.g., X direction) of a stage and performing imaging with changing the surface position of the object in the Z-axis direction. This technique can detect an object included in the thickness corresponding to the tilt, and thus eliminate the necessity of scanning in the Z direction.

In order to speed up the imaging operation in the virtual slide system, it would appear that a confocal imaging technique disclosed in Japanese Laid-open Patent Publication No. 11-211439 can be applied to the system disclosed in Japanese Laid-open Patent Publication No. 2008-191427. With this combination, the autofocus may not be required with respect to the small sections, thereby speeding up the imaging of the whole observed region.

However, a trade-off arises between a moving velocity on an object plane and a range of detectable thickness determined according to a tilt angle. With respect to an imaging apparatus capable of imaging an area of 200 μm wide at one time, for example, a case where a focal plane $P_{FC}$ is tilted by 10 μm in a thickness direction as shown in FIG. 17 is compared to a case where the focal plane $P_{FC}$ is tilted by 4 μm in the thickness direction as shown in FIG. 18. Each of imaging areas C1, C2, . . . shown in FIGS. 17 and 18 indicates an area on an object OB where image information can be acquired by a single imaging operation. In FIGS. 17 and 18, a scale size in a vertical direction is larger than that in a horizontal direction.

In FIG. 17, image information of 10 μm in the thickness direction can be acquired in a single imaging operation. In other words, the focal plane in the object OB can be searched within a range of 10 μm. In FIG. 18, on the other hand, only the image information of 4 μm in the thickness direction can be acquired. However, in tilt and image formation per 1 μm, for example, the imaging is performed by moving the stage by about 20 μm at a time in the case shown in FIG. 17 while the imaging can be performed by moving the stage by 50 μm at a time in the case shown in FIG. 18. Therefore, in the latter case, it is possible to image the whole object OB with the smaller number of times of performing the imaging, i.e., in a short time.

For this reason, a smaller amount of tilt of the object is desirable in order to shorten the time of imaging the whole observation target. To meet this condition, however, it is necessary for the observation target to be located within a range in the thickness gave from the focal plane tilting. Accordingly, in order to acquire, within a desirable imaging time, the image information on the object having a thickness, there is a need to appropriately set at least the tilt angle of the object and to appropriately move the stage according to the tilt angle.

SUMMARY

In some embodiments, an imaging apparatus includes: a stage on which an object is configured to be placed; an imaging unit having an imager configured to image the object; a movement mechanism configured to perform a relative movement between the stage and the imaging unit in at least one direction within a placement plane for placing the object; a tilt mechanism configured to tilt at least one of an imaging surface of the imager and the stage relative to a moving direction of the movement mechanism; and a tilt angle setting unit configured to set a tilt angle of the tilt mechanism based on at least a magnification of the imaging unit and a size of an effective area on the imaging surface, the effective area being an area into which observation light from the object is introduced.

In some embodiments, a microscope system includes the imaging apparatus described above, and an illumination unit configured to illuminate the object.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments of an imaging apparatus and a microscope system according to the present invention will be described below in detail with reference to the drawings. The present invention is not limited by these embodiments. The same reference signs are used to designate the same elements throughout the drawings.

First Embodiment

Figure 1:
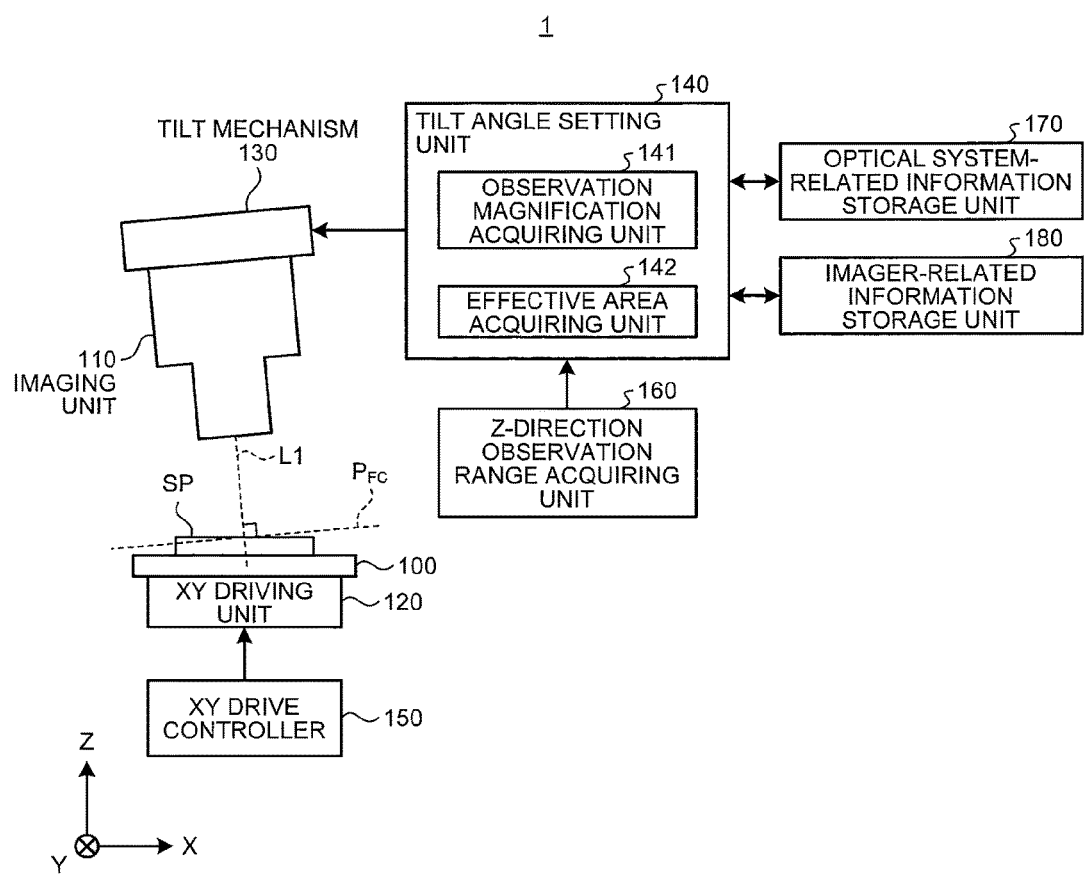
FIG. 1 is a diagram illustrating a schematic configuration of an imaging apparatus according to a first embodiment of the present invention.

FIG. 1 is a diagram illustrating a schematic configuration of an imaging apparatus according to a first embodiment of the present invention. As illustrated in FIG. 1, the imaging apparatus 1 according to the first embodiment is provided with a stage 100 for placing a sample SP as an observation target thereon and an imaging unit 110 which images the sample SP placed on the stage 100. In the following description, a sample placement plane of the stage 100 (hereinbelow, referred to as "sample plane $P_{SP}$") is defined as an XY plane, and a direction perpendicular to the sample plane $P_{SP}$ is defined as a Z direction.

The imaging apparatus 1 is further provided with an XY driving unit 120 which moves the stage 100 within the XY plane, a tilt mechanism 130 which tilts a focal plane $P_{FC}$ of the imaging unit 110 with respect to a moving direction the stage 100, a tilt angle setting unit 140 which sets the tilt angle of the focal plane $P_{FC}$ with respect to the moving direction of the stage 100 to the tilt mechanism 130, an XY drive controller 150 which controls an operation of moving the stage 100 performed by the XY driving unit 120, a Z-direction observation range acquiring unit 160 which sets an observation range in the Z direction of the sample SP, an optical system-related information storage unit 170 which stores information related to an optical system provided in the imaging unit 110, and an imager-related information storage unit 180.

Figure 2:
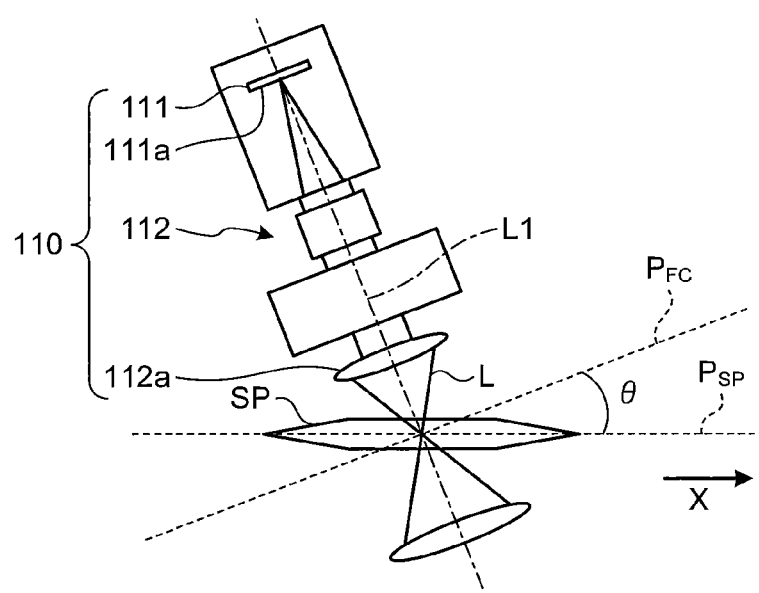
FIG. 2 is a schematic view illustrating the configuration of an imaging unit illustrated in FIG. 1.

FIG. 2 is a schematic view illustrating the configuration of the imaging unit 110 illustrated in FIG. 1. As illustrated in FIG. 2, the imaging unit 110 is provided with an imager 111 which includes a solid state imager such as a CCD and receives observation light from the sample SP to generate electronic image information and an observation optical system 112 which includes an objective lens 112a. The observation optical system 112 forms an image of observation light L from the sample SP (transmitted light or reflected light of the sample SP) on a light receiving surface (imaging surface) 111a of the imager 111. In the first embodiment, the imaging surface 111a is perpendicular to an optical axis L1 of the observation optical system 112.

The tilt mechanism 130 illustrated in FIG. 1 holds the imaging unit 110 tilted in such a manner that the focal plane $P_{FC}$ is at an angle θ with respect to the moving direction of the stage 100 as illustrated in FIG. 2 during an imaging operation of the imaging unit 110. Specifically, when the stage 100 is moved in an X direction, the tilt mechanism 130 is constituted by a rotation mechanism which is rotatable around an axis in a Y direction perpendicular to an X axis.

Referring again to FIG. 1, the XY drive controller 150 controls the XY driving unit 120 so as to move the stage 100 in a specified direction (e.g., X direction) during the imaging operation of the imaging unit 110.

The tilt angle setting unit 140 calculates the tilt angle θ of the focal plane $P_{FC}$ and sets the tilt angle θ to the tilt mechanism 130. More specifically, the tilt angle setting unit 140 is provided with an observation magnification acquiring unit 141 which acquires an observation magnification (image magnification) of the imaging unit 110 and an effective area acquiring unit 142 which acquires the size of an effective area which is an area on the imaging surface 111a from which the imaging unit 110 takes observation light from the sample SP. The tilt angle setting unit 140 calculates the tilt angle θ of the imaging unit 110 on the basis of the acquired observation magnification and the acquired size of the effective area.

The Z-direction observation range acquiring unit 160 acquires a range in the Z direction that can be acquired in a single shot with the focal plane $P_{FC}$ tilted.

The optical system-related information storage unit 170 stores information related to the observation optical system 112 such as the observation magnification and the numerical aperture.

The imager-related information storage unit 180 stores information related to specifications of the imager 111 such as the size of the imaging surface 111a and the number of pixels.

Figure 3:
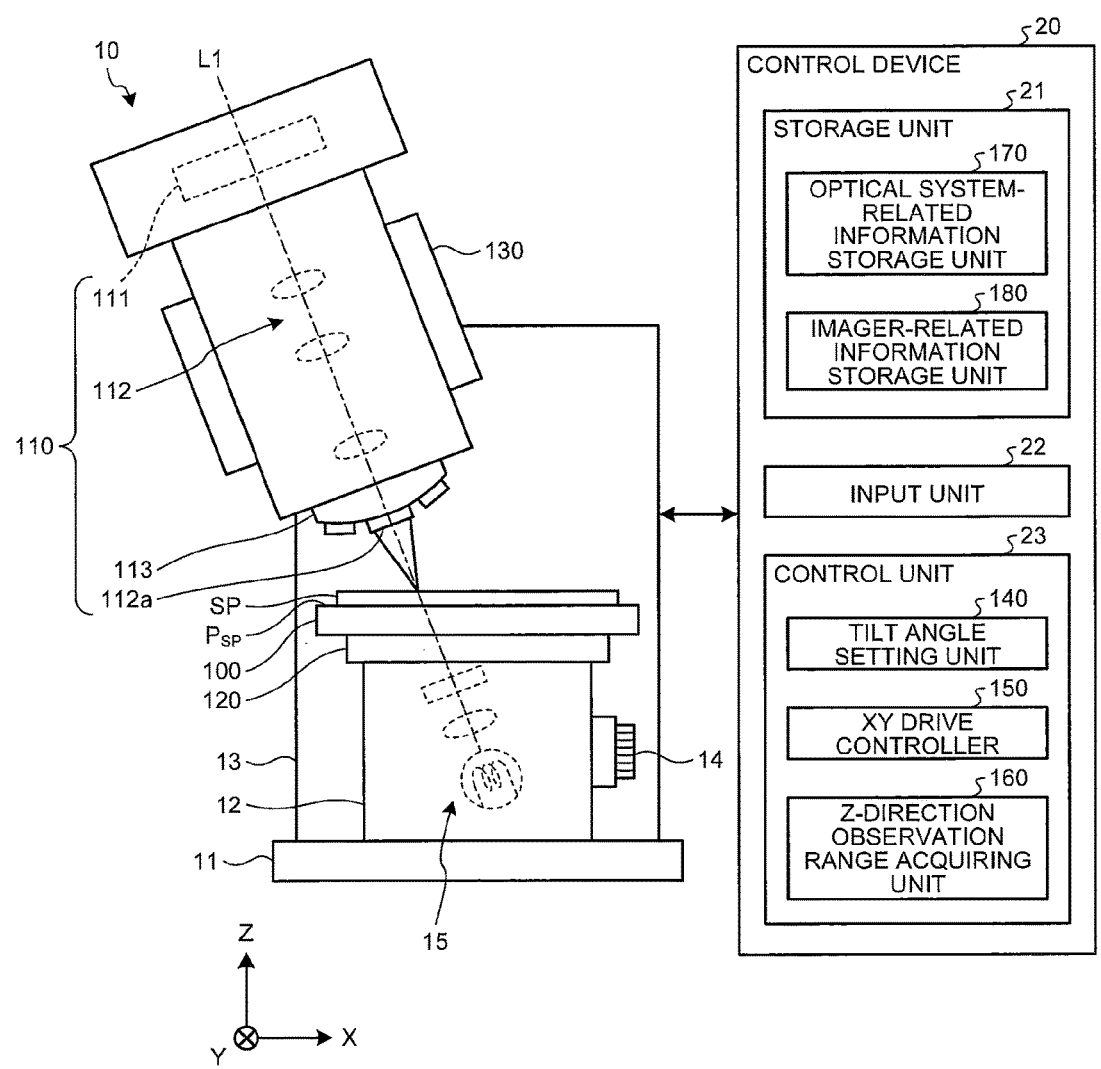
FIG. 3 is a schematic view illustrating an example in which the imaging apparatus illustrated in FIG. 1 is applied to a microscope system.

FIG. 3 is a schematic view illustrating an example in which the imaging apparatus 1 illustrated in FIG. 1 is applied to a microscope system. The microscope system illustrated in FIG. 3 is provided with a microscope 10 and a control device 20.

The microscope 10 is provided with a base 11, a stage mount 12 set on the base 11, and a strut 13 set on the base 11. The stage 100 is disposed on the stage mount 12 with the XY driving unit 120 interposed therebetween. Further, an adjustment knob 14 which moves the stage 100 in the Z direction is disposed on the stage mount 12.

A transmitted-light illumination optical system 15 which applies illumination light to the sample SP is arranged inside the stage mount 12. As a mechanism for illuminating the sample SP, a vertical lighting system can be provided in place of the transmitted-light illumination optical system 15.

On the other hand, the imaging unit 110 is disposed on the strut 13 with the tilt mechanism 130 interposed therebetween. The imaging unit 110 can be further provided with a revolver 113 which replaceably holds a plurality of objective lenses having different magnifications.

The control device 20 includes, for example, a general-purpose personal computer. The control device 20 is provided with a storage unit 21, an input unit 22, and a control unit 23.

The storage unit 21 is implemented by a semiconductor memory such as a flash memory, a RAM and a ROM, or a recording medium such as a HDD, an MO, a CD-R and a DVD-R and a driving device which drives the recording medium. The storage unit 21 stores, for example, programs for allowing the control device 20 to execute various operations, various pieces of information used during the execution of the programs, and image information output from the imaging unit 110. In the first embodiment, the optical system-related information storage unit 170 and the imager-related information storage unit 180 are provided in the storage unit 21.

The input unit 22 includes an input device such as a keyboard, a touch panel, and a mouse. The input unit 22 is used when a user inputs various pieces of information used in the control device 20.

The control unit 23 includes hardware such as a CPU. The control unit 23 reads a program stored in the storage unit 21 to perform control for allowing the microscope system to execute an imaging operation on the basis of various pieces of data stored in the storage unit 21 and various pieces of information input from the input unit 22. In the first embodiment, the control unit 23 includes the tilt angle setting unit 140, the XY drive controller 150, and the Z-direction observation range acquiring unit 160.

Figure 4:
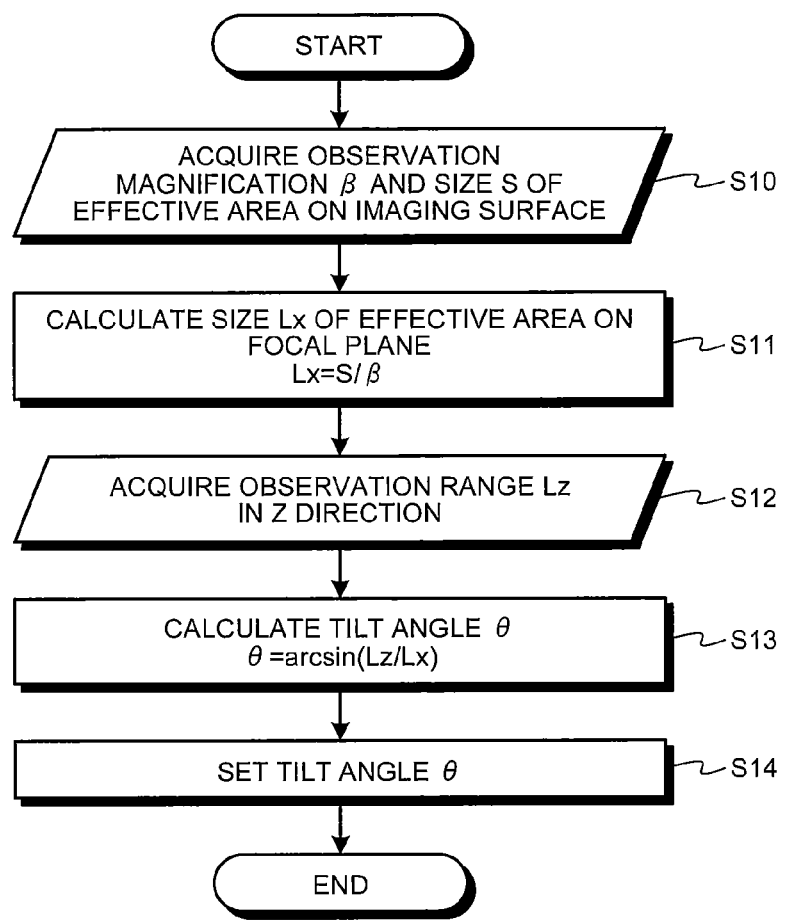
FIG. 4 is a flowchart illustrating operation of the imaging apparatus illustrated in FIG. 1.

Next, operation of the imaging apparatus 1 illustrated in FIG. 1 will be described. FIG. 4 is a flowchart illustrating the operation of the imaging apparatus 1. In the following description, the stage 100 is moved in the X direction.

First, in step S10, the tilt angle setting unit 140 acquires an observation magnification β and a size S of the effective area on the imaging surface 111a. More specifically, an observation magnification acquiring unit 141 reads the observation magnification β previously stored in the optical system-related information storage unit 170. Alternatively, the observation magnification acquiring unit 141 may acquire the observation magnification β that a user is asking for on the basis of information input by the user through the input unit 22 (refer to FIG. 3).

Further, when the revolver 113 is disposed on the imaging unit 110 to enable replacement of the objective lens 112a as illustrated in FIG. 3, an encoder may be provided in the revolver 113 to enable the observation magnification acquiring unit 141 to acquire the magnification of an objective lens which faces the sample SP on the basis of an output value of the encoder. In this case, the observation magnification acquiring unit 141 calculates the observation magnification β of the imaging unit 110 on the basis of the acquired magnification of the objective lens.

On the other hand, the effective area acquiring unit 142 reads the size S of the effective area on the imaging surface 111a previously stored in the imager-related information storage unit 180. The effective area on the imaging surface 111a indicates an area on the imaging surface 111a in which the imager 111 can capture image information (image data) by one imaging operation. The effective area is determined by the specifications of the imager 111. Here, the length of one side corresponding to the X direction which is the moving direction of the stage 100 is used as the size S. When the imaging unit 110 performs trimming to partially capture an observation image, the size after the trimming is used as the size of the effective area. Further, the definition of the size of the effective area may include the size of an image forming area of the imaging surface 111a or the size of the imager 111 itself.

Figure 5:
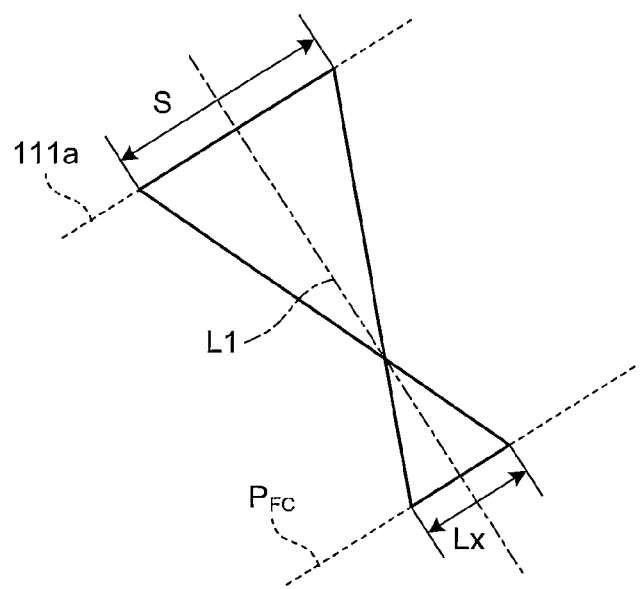
FIG. 5 is a schematic view describing the relationship between the size of an effective area on an imaging surface and the size of an effective area on a focal plane.

In step S11 following thereafter, the tilt angle setting unit 140 calculates a size Lx of an effective area on the focal plane $P_{FC}$ using the observation magnification β and the size S of the effective area. Here, the effective area on the focal plane $P_{FC}$ indicates an area on the focal plane $P_{FC}$ in which image information can be acquired by one imaging operation performed by the imaging unit 110 and determined by the size S of the effective area on the imaging surface 111a and the observation magnification β as illustrated in FIG. 5.

Specifically, the tilt angle setting unit 140 calculates the size Lx using the following Equation (1).

$$Lx = \frac{S}{\beta} \quad (1)$$

Figure 6:
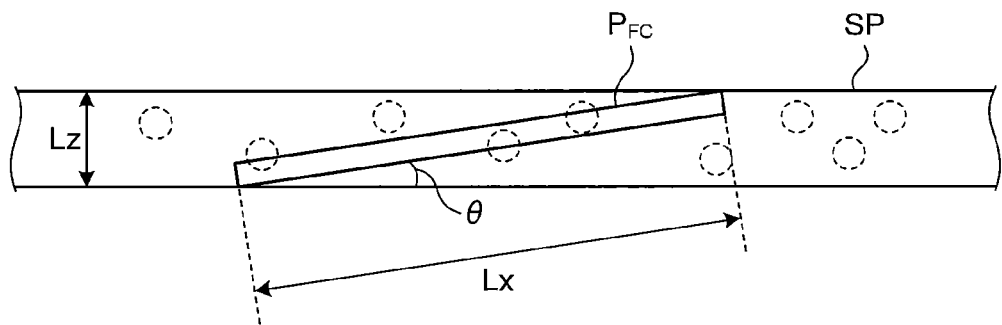
FIG. 6 is a schematic view illustrating the relationship between a sample, the size in the X direction of the effective area on the focal plane, and an observation range in the Z direction.

In step S12 following thereafter, the Z-direction observation range acquiring unit 160 acquires a value of an observation range Lz in Z direction and inputs the acquired value to the tilt angle setting unit 140. FIG. 6 is a schematic view illustrating the relationship between the sample SP, the size Lx in the X direction of the effective area on the focal plane $P_{FC}$, and the Z-direction observation range Lz.

When the sample SP is a sliced specimen obtained by slicing a pathological specimen, the thickness of the sliced specimen typically has substantially a constant value (e.g., 3 to 5 μm) due to setting of a microtome. Thus, the observation range Lz is set to a value corresponding to the thickness of a typical sliced specimen and previously stored in the Z-direction observation range acquiring unit 160. Alternatively, the input unit 22 (refer to FIG. 3) may be used to enable a user to input a desired value of the observation range Lz. In this case, the Z-direction observation range acquiring unit 160 inputs the value of the observation range Lz input by the user to the tilt angle setting unit 140. Alternatively, the imaging apparatus 1 may be configured in such a manner that information on a microtome that is prepared the sliced specimen (e.g., information on the thickness between slices, or the like) is automatically input to the Z-direction observation range acquiring unit 160.

In the following step S13, the tilt angle setting unit 140 calculates the tilt angle θ using the size Lx of the effective area on the focal plane $P_{FC}$ calculated in step S11 and the observation range Lz from the Z-direction observation range acquiring unit 160 in step S12. As illustrated in FIG. 6, the relationship between the size Lx and the observation range Lz is given by the following Equation (2).

$$\sin\theta = \frac{Lz}{Lx} \quad (2)$$

Therefore, the tilt angle θ is given by the following Equation (3).

$$\theta = \arcsin\left(\frac{Lz}{Lx}\right) \quad (3)$$

Further, in step S14, the tilt angle setting unit 140 sets the tilt angle θ of tilting the imaging unit 110 to the tilt mechanism 130. Accordingly, the focal plane $P_{FC}$ of the imaging unit 110 is tilted by the angle θ with respect to the X direction. Then, the imaging unit 110 images the sample SP with the focal plane $P_{FC}$ tilted with respect to the X direction.

As described above, the first embodiment makes it possible to appropriately set the tilt angle θ using the observation magnification β of the observation optical system 112, the size S of the effective area of the imaging surface 111a, and the observation range Lz based on the thickness of the sample SP. Thus, it is possible to acquire three-dimensional image information of the sample SP by moving the stage 100 while sufficiently acquiring information of the sample SP in the thickness direction.

First Modification

Next, a first modification of the first embodiment will be described.

Figure 7:
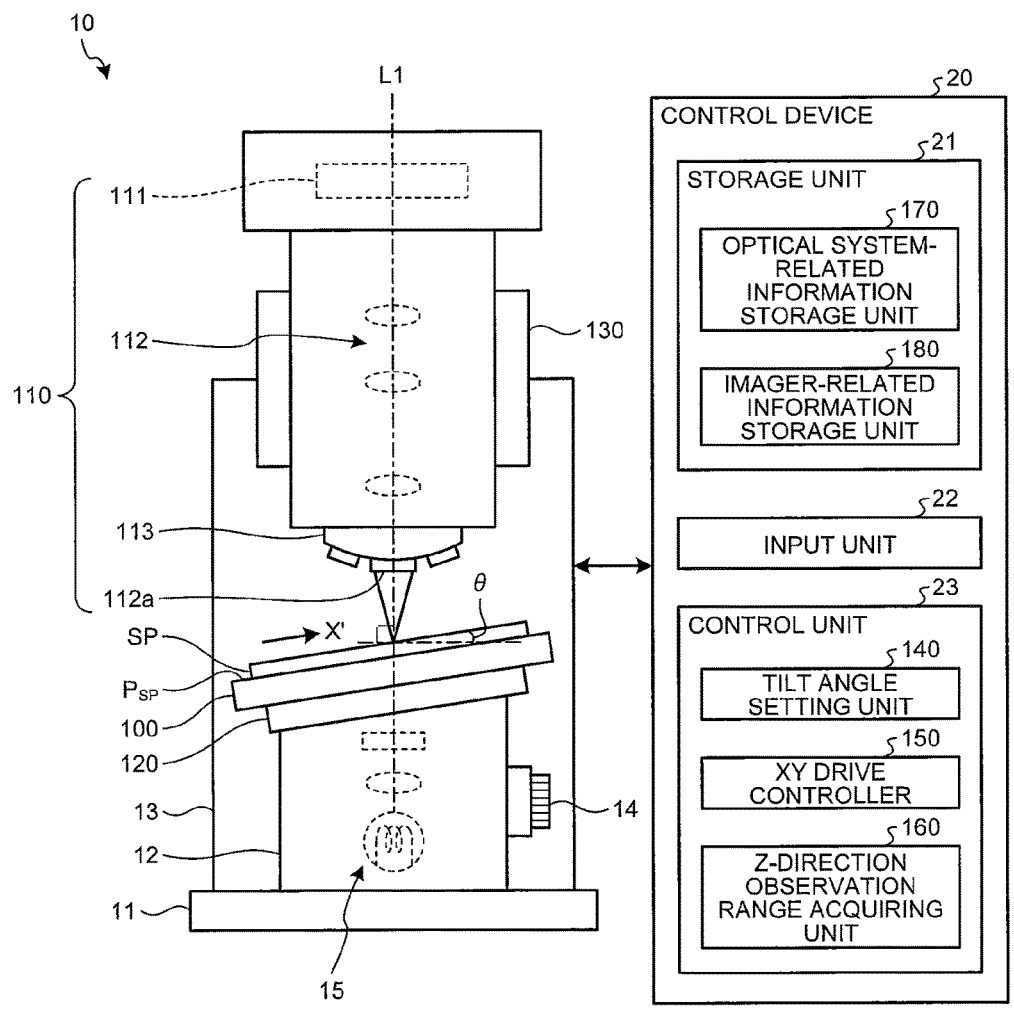
FIG. 7 is a schematic view illustrating a schematic configuration of a microscope system according to a first modification of the first embodiment.

FIG. 7 is a schematic view illustrating a schematic configuration of an imaging apparatus according to the first modification. In the first embodiment, there has been described an example in which the stage 100 is horizontally arranged and the optical axis L1 of the observation optical system 112 and the transmitted-light illumination optical system 15 is tilted with respect to the stage 100 (refer to FIG. 3). Instead, as illustrated in FIG. 7, the observation optical system 112 and the transmitted-light illumination optical system 15 may be arranged in a manner to align the optical axis L1 with the vertical direction and the stage 100 may be tilted with respect to the horizontal direction. In this case, imaging is performed by the imaging unit 110 while moving the stage 100 along the tilted direction (X' direction) of the sample plane $P_{SP}$.

Second Modification

Next, a second modification of the first embodiment will be described.

In the first embodiment, the observation optical system 112 and the transmitted-light illumination optical system 15 are totally tilted to tilt the focal plane $P_{FC}$ with respect to the moving direction of the stage 100. Instead, the observation optical system 112, the transmitted-light illumination optical system 15, and the stage 100 may be arranged in a manner to allow the optical axis L1 to be perpendicular to the sample plane $P_{SP}$, and the imaging surface 111a of the imager may be tilted with respect to the optical axis L1.

As an example, in the imaging unit 110, the imager 111 is arranged in such a manner that the imaging surface 111a of the imager 111 is tilted by an angle θ with respect to a plane perpendicular to the optical axis L1 around a Y axis as a rotary axis. Accordingly, it is possible to acquire an image with the focal plane $P_{FC}$ substantially tilted with respect to the moving direction (X direction) of the stage 100.

Second Embodiment

Next, a second embodiment of the present invention will be described.

Figure 8:
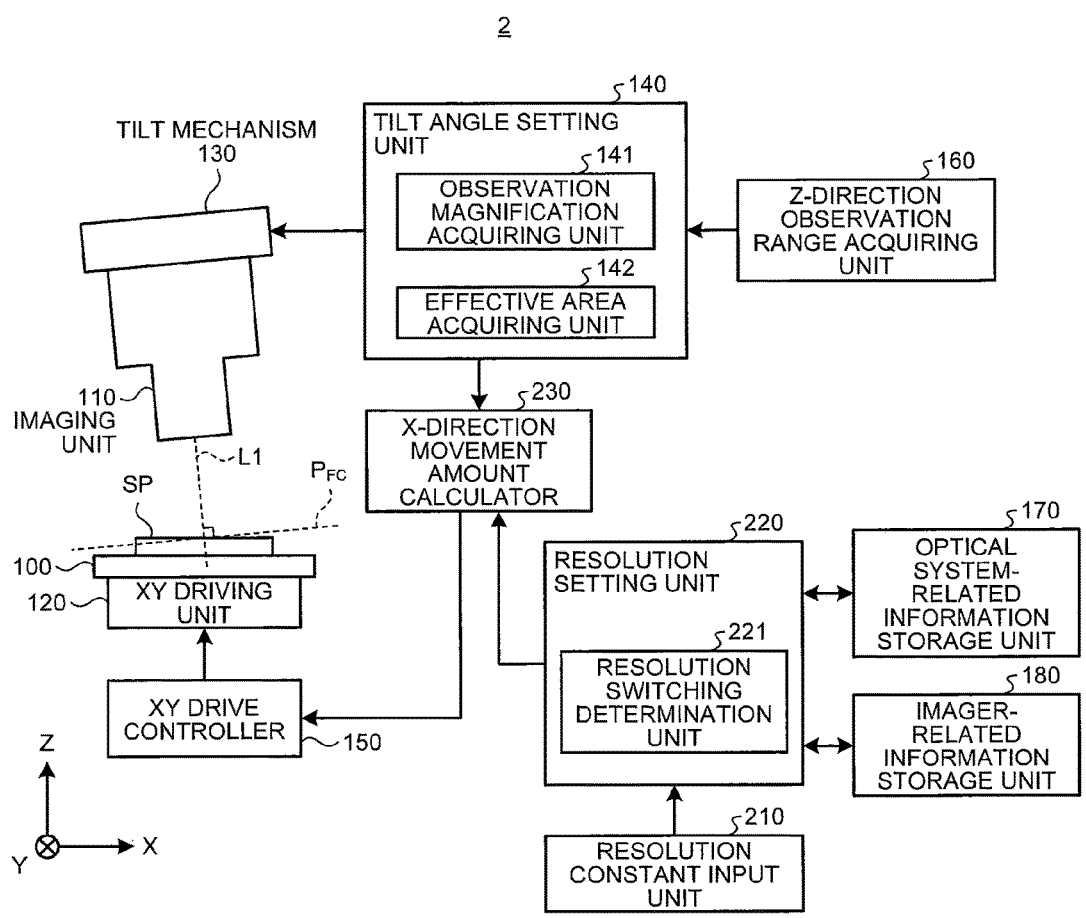
FIG. 8 is a diagram illustrating a schematic configuration of an imaging apparatus according to a second embodiment.

FIG. 8 is a diagram illustrating a schematic configuration of an imaging apparatus according to the second embodiment of the present invention.

As illustrated in FIG. 8, the imaging apparatus 2 according to the second embodiment is further provided with a resolution constant input unit 210, a resolution setting unit 220, and an X-direction movement amount calculator 230 in addition to the configuration of the imaging apparatus 1 illustrated in FIG. 1.

Figure 9:
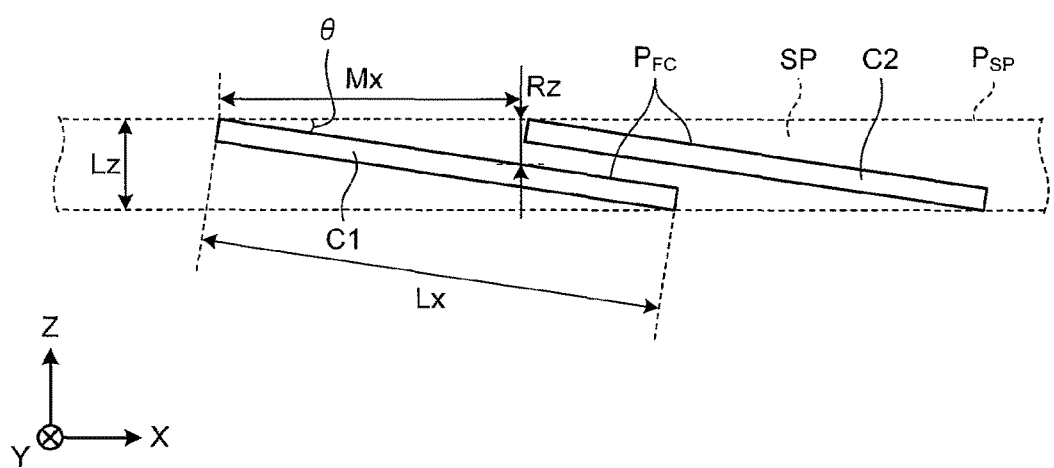
FIG. 9 is a conceptual diagram for describing an imaging operation of the imaging apparatus illustrated in FIG. 8.

FIG. 9 is a schematic view for describing an imaging operation of the imaging apparatus 2. As illustrated in FIG. 9, the imaging apparatus 2 continuously performs imaging at a specified imaging cycle while moving the stage 100 with the focal plane $P_{FC}$ tilted with respect to the moving direction of the stage 100. An imaging area C1 indicates an area within the sample SP to be an imaging target in the first imaging operation. An imaging area C2 indicates an area within the sample SP to be an imaging target in the second imaging operation.

In order to obtain a resolution Rz that the user is asking for in the thickness direction (Z direction) of the sample SP, it is necessary to appropriately set a movement amount Mx of moving the stage 100 at each imaging operation. Thus, in the second embodiment, an appropriate movement amount Mx is calculated on the basis of a tilt angle θ set by the tilt angle setting unit 140 and the resolution Rz that the user is asking for, and the sample SP is imaged while moving the stage 100 on the basis of the movement amount Mx.

The resolution constant input unit 210 illustrated in FIG. 8 includes an input device such as a keyboard, a mouse, and a touch penal. The resolution constant input unit 210 is used by a user for inputting a constant which is used in setting of the resolution Rz.

The resolution setting unit 220 is provided with a resolution switching determination unit 221 which performs determination of switching of a method for calculating the resolution Rz. The resolution setting unit 220 calculates the resolution Rz on the basis of a result of the determination performed by the resolution switching determination unit 221 and the constant input through the resolution constant input unit 210 and sets the resolution Rz to the X-direction movement amount calculator 230.

The X-direction movement amount calculator 230 calculates the movement amount Mx in the X direction of moving the stage 100 at each imaging operation on the basis of the tilt angle θ set by the tilt angle setting unit 140 and the resolution Rz set by the resolution setting unit 220 and sets the movement amount Mx to the XY drive controller 150.

The configuration and operation of each unit of the imaging apparatus 2 other than the resolution constant input unit 210, the resolution setting unit 220, and the X-direction movement amount calculator 230 are similar to those of the first embodiment.

Figure 10:
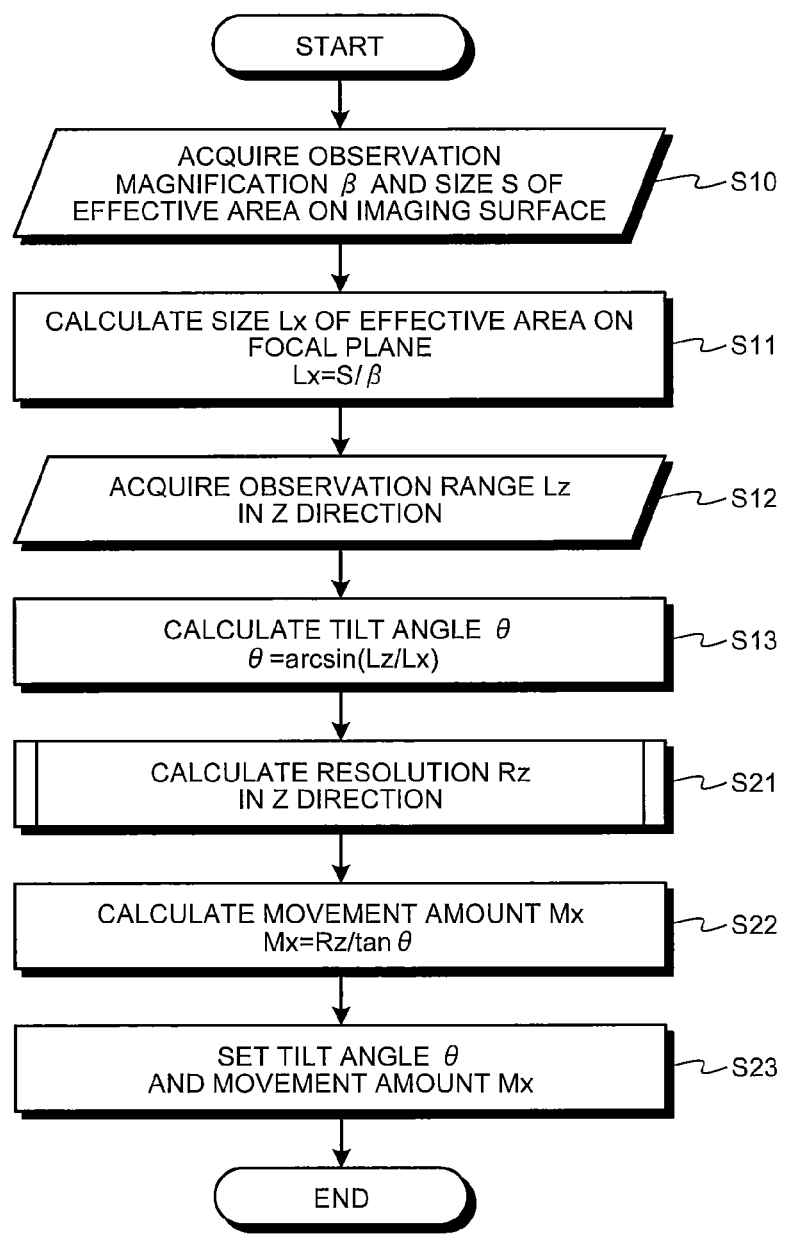
FIG. 10 is a flowchart illustrating operation of the imaging apparatus illustrated in FIG. 8.

Next, operation of the imaging apparatus 2 will be described. FIG. 10 is a flowchart illustrating the operation of the imaging apparatus 2. Steps S10 to S13 of FIG. 10 are similar to those of the first embodiment (refer to FIG. 4).

In step S21 following step S13, the resolution setting unit 220 calculates the resolution Rz in the Z direction. A method for calculating the resolution Rz will be described below.

In step S22 following thereafter, the X-direction movement amount calculator 230 calculates the movement amount Mx of moving the stage 100 in the X direction at each imaging operation on the basis of the tilt angle θ calculated in step S13 and the resolution Rz calculated in step S21.

As illustrated in FIG. 9, the imaging areas C1 and C2 move relative to the sample SP by moving the stage 100 by the movement amount Mx. At this point, a relationship represented by the following Equation (4) is satisfied between the distance between one end of the imaging area C1 and one end of the imaging area C2 (that is, the movement amount Mx), a size Lx of each of the imaging areas C1 and C2 determined by the magnification of the imaging unit 110, an observation range Lz in the Z direction, and the resolution Rz. The following Equation (4) is derived from the similarity relation between a triangle having the movement amount Mx and the resolution Rz as its two sides and a triangle having the size Lx and the observation range Lz as its two sides.

$$Mx = \frac{Rz}{\tan\theta} = \frac{Rz}{\tan\left(\arcsin\left(\frac{Lz}{Lx}\right)\right)} = \frac{Rz}{\tan\left(\arcsin\left(\beta\frac{Lz}{S}\right)\right)} \quad (4)$$

Assuming that the tilt angle θ is small, Equation (4) can be simplified as the following Equation (5).

$$\frac{Lz}{\sqrt{Lx^2 - Lz^2}} \approx \frac{Lz}{Lx} = \beta\frac{Lz}{S} = \frac{Rz}{Mx} \quad (5)$$

$$Mx = \frac{RzS}{Lz\beta}$$

The X-direction movement amount calculator 230 calculates the movement amount Mx using Equation (5).

Further, in step S23, the tilt angle setting unit 140 sets the tilt angle θ of the imaging unit 110 (focal plane $P_{FC}$) to the tilt mechanism 130, and the X-direction movement amount calculator 230 sets the movement amount Mx of the stage 100 to the XY drive controller 150. Then, the imaging unit 110 continuously images the sample SP while moving the stage 100 at each imaging operation with the focal plane $P_{FC}$ tilted with respect to the X direction.

Figure 11:
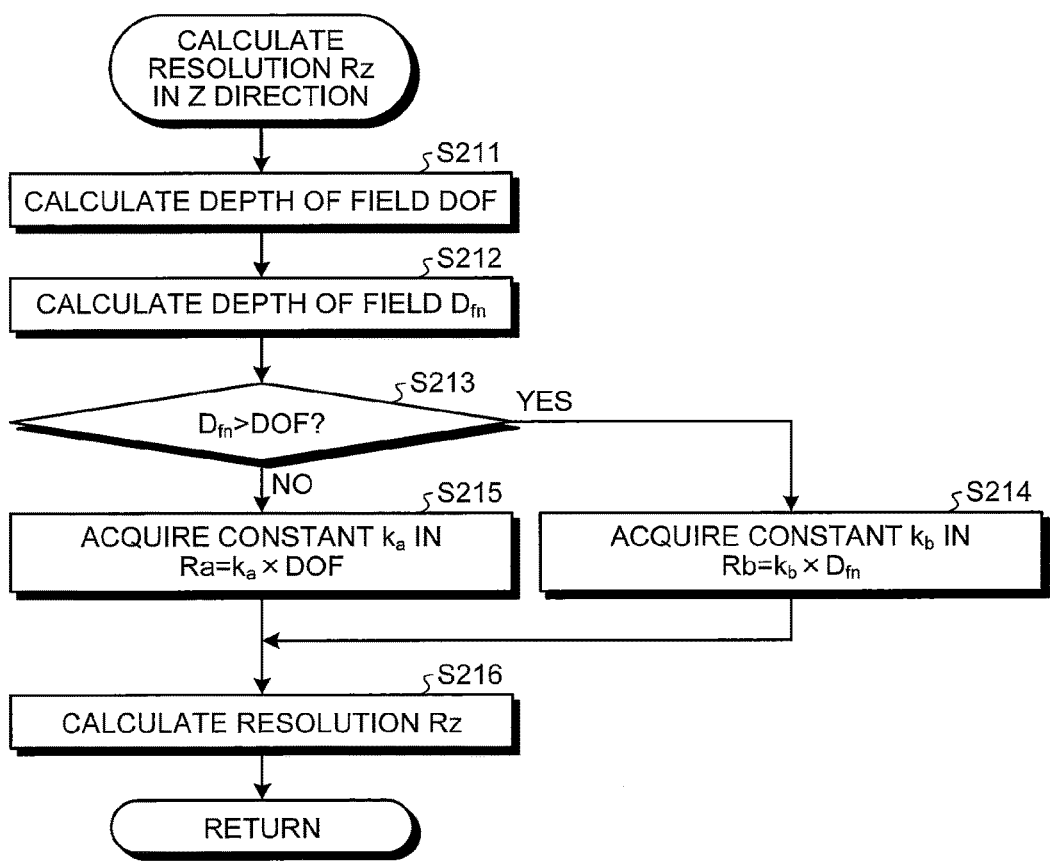
FIG. 11 is a flowchart illustrating a process for calculating the resolution in the Z direction executed by a resolution setting unit.

Next, the operation of the resolution setting unit 220 in step S21 will be described. FIG. 11 is a flowchart illustrating a process for calculating the resolution in the Z direction executed by the resolution setting unit 220.

In step S211, the resolution setting unit 220 calculates a depth of field DOF based on the design (performance) of the observation optical system 112 provided in the imaging unit 110.

A resolution Ra based on the depth of field DOF is given by the following Equations (6-1) and (6-2), where NA denotes the numerical aperture of the observation optical system 112, n denotes the refractive index of a medium present between the objective lens 112a and the sample SP, λ denotes the wavelength of observation light from the sample SP, and $k_a$ denotes arbitrary constant.

$$Ra = k_a \times DOF \quad (6\text{-}1)$$

$$DOF = \frac{n\lambda}{2(NA)^2} \quad (6\text{-}2)$$

Information related to each characteristic value such as the numerical aperture NA, the refractive index n of the medium, and the wavelength λ is previously stored in the optical system-related information storage unit 170, and the resolution setting unit 220 acquires the information from the optical system-related information storage unit 170 as needed. The refractive index n of the medium satisfies n>1 in an immersion microscope in which a gap between the objective lens 112a and the sample SP is filled with liquid or when the objective lens 112a is in direct contact with the sample SP.

In step S212 following thereafter, the resolution setting unit 220 calculates a depth of field $D_{fn}$ based on the resolution of the imager 111. The order of performing step S211 and step S212 is changable, or step S211 and step S212 may be simultaneously performed.

The resolution can be set depending on how many times of resolution is asked for by the user with respect to the depth of field $D_{fn}$ based on the resolution of the imager 111. In this case, a resolution Rb is determined by setting a constant $k_b$ in the following Equation (7) by a user.

$$Rb = k_b \times D_{fn} \quad (7)$$

The resolution between two points on the imaging surface 111a of the imager 111 is represented by the diameter c of a permissible circle of confusion. A distance H of focusing infinity within the depth of field is called a hyperfocal distance. The hyperfocal distance H is given by the following Equation (8), $$H = \frac{2f^2 NA}{c} \quad (8)$$

where, NA denotes the numerical aperture of the observation optical system 112 and f denotes the focal distance.

Information related to each characteristic value of the optical system and information related to the specifications of the imager 111 are previously stored in the optical system-related information storage unit 170 and the imager-related information storage unit 180, respectively, and the resolution setting unit 220 acquires the information as needed.

A front point $D_n$ and a rear point $D_f$ of the depth of field are respectively given by Equation (9-1) and Equation (9-2). Thus, the depth of field $D_{fn}$ is calculated by. Equation (9-3).

$$D_n = \frac{s(H-f)}{H+s-2f} \quad (9\text{-}1)$$

$$D_f = \frac{s(H-f)}{H-f} \quad (9\text{-}2)$$

$$D_{fn} = D_f - D_n = \frac{2s(H-f)(s-f)}{(H+s-2f)(H-f)} \quad (9\text{-}3)$$

In Equations (9-1), (9-2), and (9-3), "s" denotes the distance (object distance) between the sample SP and the observation optical system 112.

In step S213 following thereafter, the resolution switching determination unit 221 determines which one is larger the depth of field DOF calculated in step S211 or the depth of field $D_{fn}$ calculated in step S212.

Assuming that observation is performed with approximately 20 times larger magnification, when the focal distance f=25 mm, the numerical aperture NA=0.5, a pixel size in the imager 111 is 2 μm, the diameter c of the permissible circle of confusion=4 μm, and the object distance s=20 mm, the depth of field $D_{fn}$ is approximately 2 μm from Equation (9-3). On the other hand, when the refractive index of the medium present between the observation optical system 112 and the sample SP satisfies n=1, and the wavelength of observation light satisfies λ=0.5 μm, the depth of field DOF is approximately 1 μm from Equation (6-2).

When $D_{fn}$>DOF is satisfied in this manner (Yes in step S213), it is not necessary to set the resolution Rz more minutely than the resolution Rb which is resolvable in the imager 111. Thus, in this case, the resolution setting unit 220 sets the resolution Rb resolvable in the imager 111 as the resolution Rz, and acquires the constant $k_b$ in Equation (7) through the resolution constant input unit 210 (step S214).

In this case, in step S216 following thereafter, the resolution setting unit 220 calculates the resolution Rb given by the pixel size based on the numerical aperture NA, the focal distance f, the object distance s and the specifications of the imager 111, and the constant $k_b$ input by a user as the resolution Rz.

On the other hand, when the refractive index of the medium satisfies n>1 in an immersion microscope or when high magnification observation is performed, $D_{fn}$<DOF is likely to be satisfied (No in step S213). In this case, the resolution setting unit 220 sets the resolution Ra obtained by multiplying the depth of field DOF based on the performance of the observation optical system 112 by a desired magnification $k_a$ as the resolution Rz, and acquires the constant $k_a$ in Equation (6-1) through the resolution constant input unit 210 (step S215).

In this case, in step S216 following thereafter, the resolution setting unit 220 calculates the resolution Ra given by the numerical aperture NA, the refractive index n of the medium, the wavelength λ of observation light, and the constant $k_a$ input by a user as the resolution Rz. Typically, the constant $k_a$ is set to satisfy $k_a$>0.5.

Then, the process returns to a main routine.

As described above, according to the second embodiment, the movement amount Mx calculated on the basis of the resolution Rz that the user is asking for is set in addition to the tilt angle θ, and imaging is performed a plurality of times while moving the stage 100 relative to the imaging unit 110. Therefore, image information at a plurality of focal points of the sample or three-dimensional image information based on a plurality of focusing information items can be acquired at high speed and with high accuracy.

In the second embodiment, the relative movement is achieved by fixing the imaging unit 110 and moving the stage 100. Instead, the relative movement may be achieved by fixing the sample SP and moving the imaging unit 110.

Third Embodiment

Next, a third embodiment of the present invention will be described.

Figure 12:
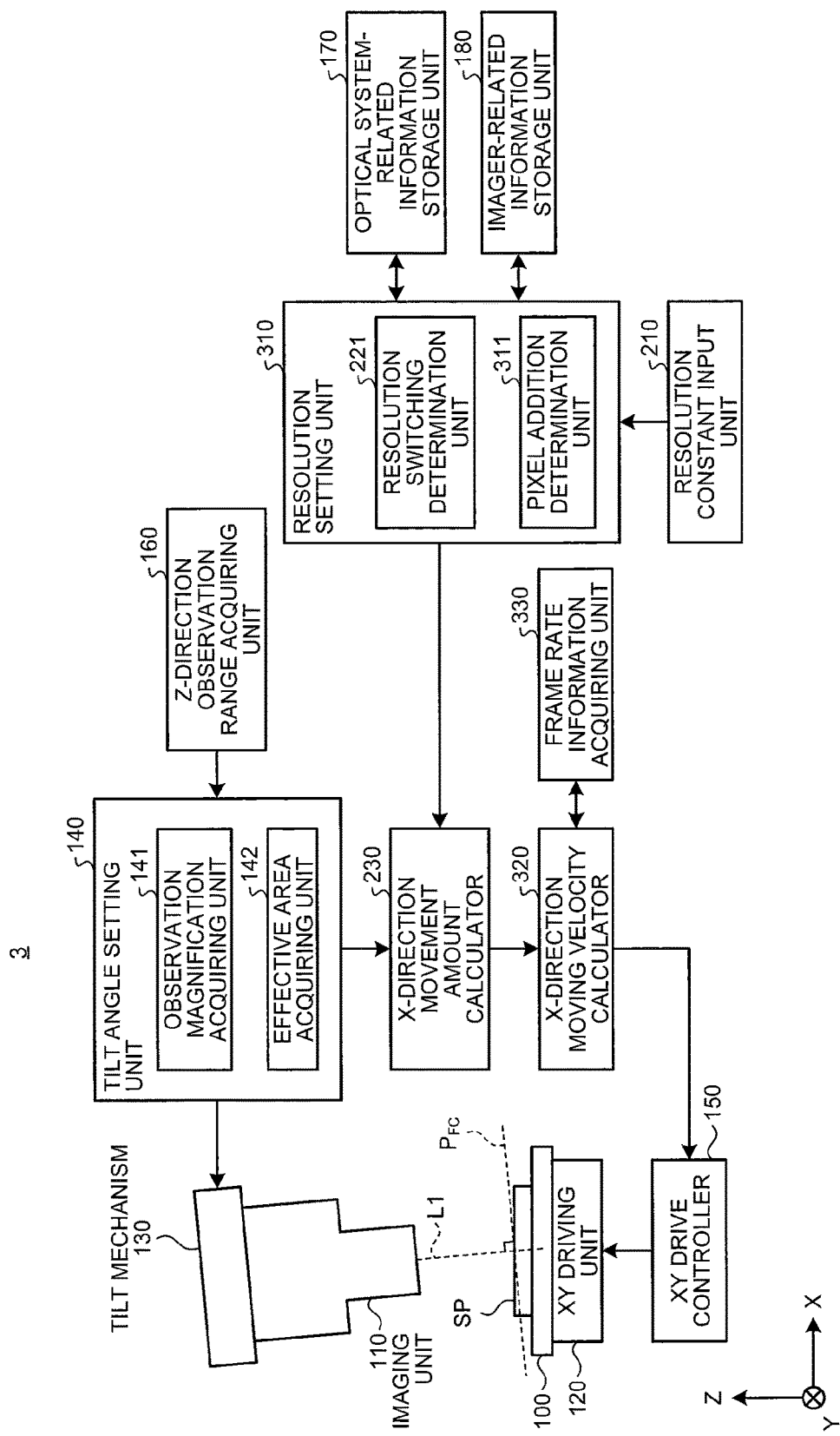
FIG. 12 is a diagram illustrating a schematic configuration of an imaging apparatus according to a third embodiment.

FIG. 12 is a diagram illustrating a schematic configuration of an imaging apparatus according to the third embodiment of the present invention. As illustrated in FIG. 12, the imaging apparatus 3 according to the third embodiment is provided with a resolution setting unit 310 in place of the resolution setting unit 220 illustrated in FIG. 8 and further provided with an X-direction moving velocity calculator 320 and a frame rate information acquiring unit 330.

The resolution setting unit 310 is further provided with a pixel addition determination unit 311 which determines whether the imaging unit 110 performs image addition in addition to the resolution switching determination unit 221. The resolution setting unit 310 calculates a resolution Rz to be set to the X-direction movement amount calculator 230 on the basis of a result of the determination performed by the pixel addition determination unit 311.

The X-direction moving velocity calculator 320 calculates the moving velocity of the stage 100 when the imaging unit 110 images a moving image of the sample SP on the basis of a movement amount Mx of the stage 100 calculated by the X-direction movement amount calculator 230 and the frame rate of the imaging unit 110.

The frame rate information acquiring unit 330 acquires and holds the frame rate when the imaging unit 110 images a moving image.

The configuration and operation of each unit of the imaging apparatus 3 other than the resolution setting unit 310, the X-direction moving velocity calculator 320, and the frame rate information acquiring unit 330 are similar to those of the second embodiment.

Figure 13:
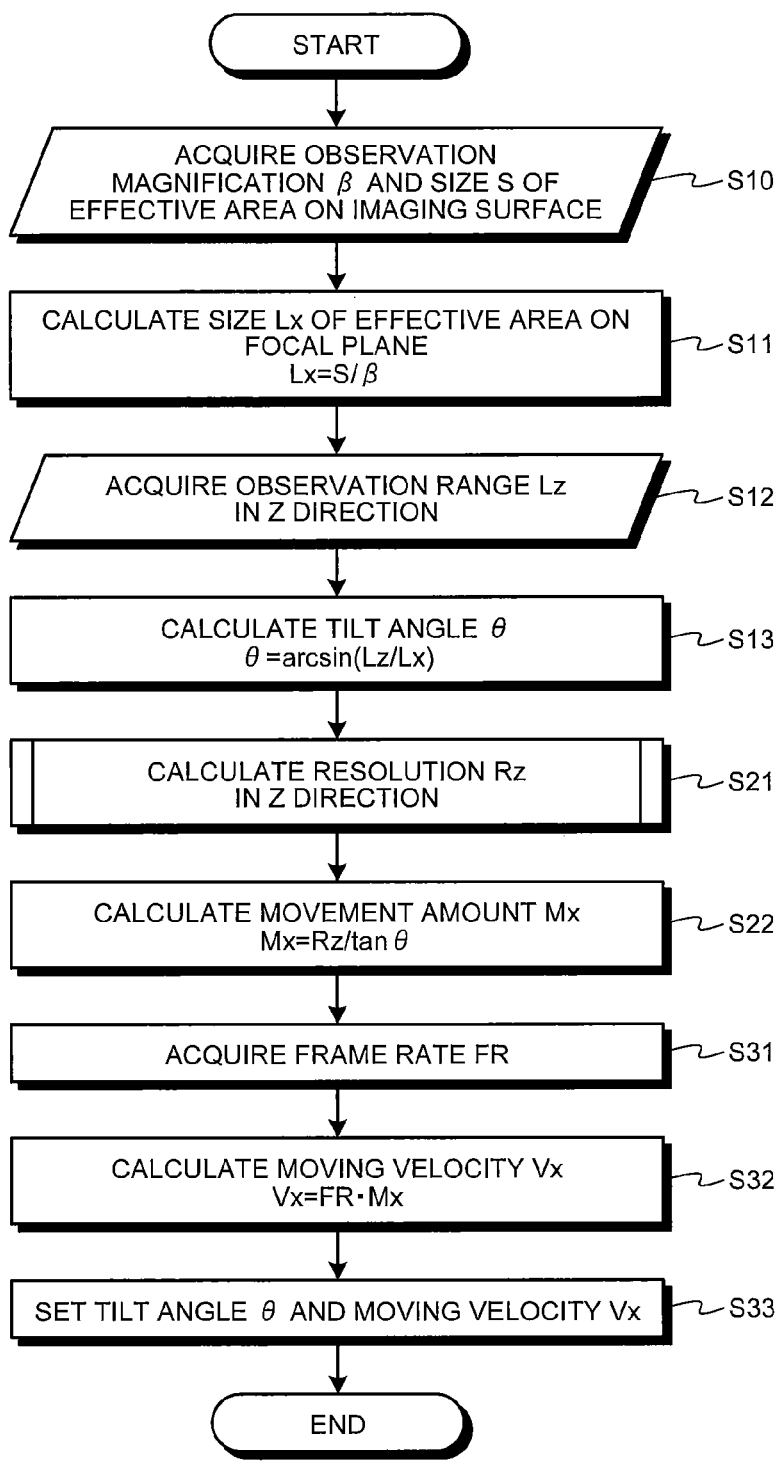
FIG. 13 is a flowchart illustrating operation of the imaging apparatus illustrated in FIG. 12.

Next, operation of the imaging apparatus 3 will be described. FIG. 13 is a flowchart illustrating the operation of the imaging apparatus 3. Steps S10 to S22 of FIG. 13 correspond to those of the second embodiment (refer to FIG. 10). As will be described below, a specific operation when the depth of field $D_{fn}$ is calculated in step S212 of FIG. 11 differs from that of the second embodiment.

In step S31 following step S22, the X-direction moving velocity calculator 320 acquires a frame rate FR of the imaging unit 110 from the frame rate information acquiring unit 330.

In step S32 following thereafter, the X-direction moving velocity calculator 320 calculates a moving velocity Vx of the stage 100 given by the following Equation (10) using the movement amount Mx (m) per one imaging operation calculated by the X-direction movement amount calculator 230 and the frame rate FR (fps).

$$Vx = FR \cdot Mx \qquad (10)$$

Further, in step S33, the tilt angle setting unit 140 sets a tilt angle θ of the imaging unit 110 (focal plane $P_{FC}$) to the tilt mechanism 130, and the X-direction moving velocity calculator 320 sets the moving velocity Vx of the stage 100 to the XY drive controller 150. Then, the imaging unit 110 images a moving image of the sample SP while moving the stage 100 with the focal plane $P_{FC}$ tilted with respect to the X direction.

Figure 14:
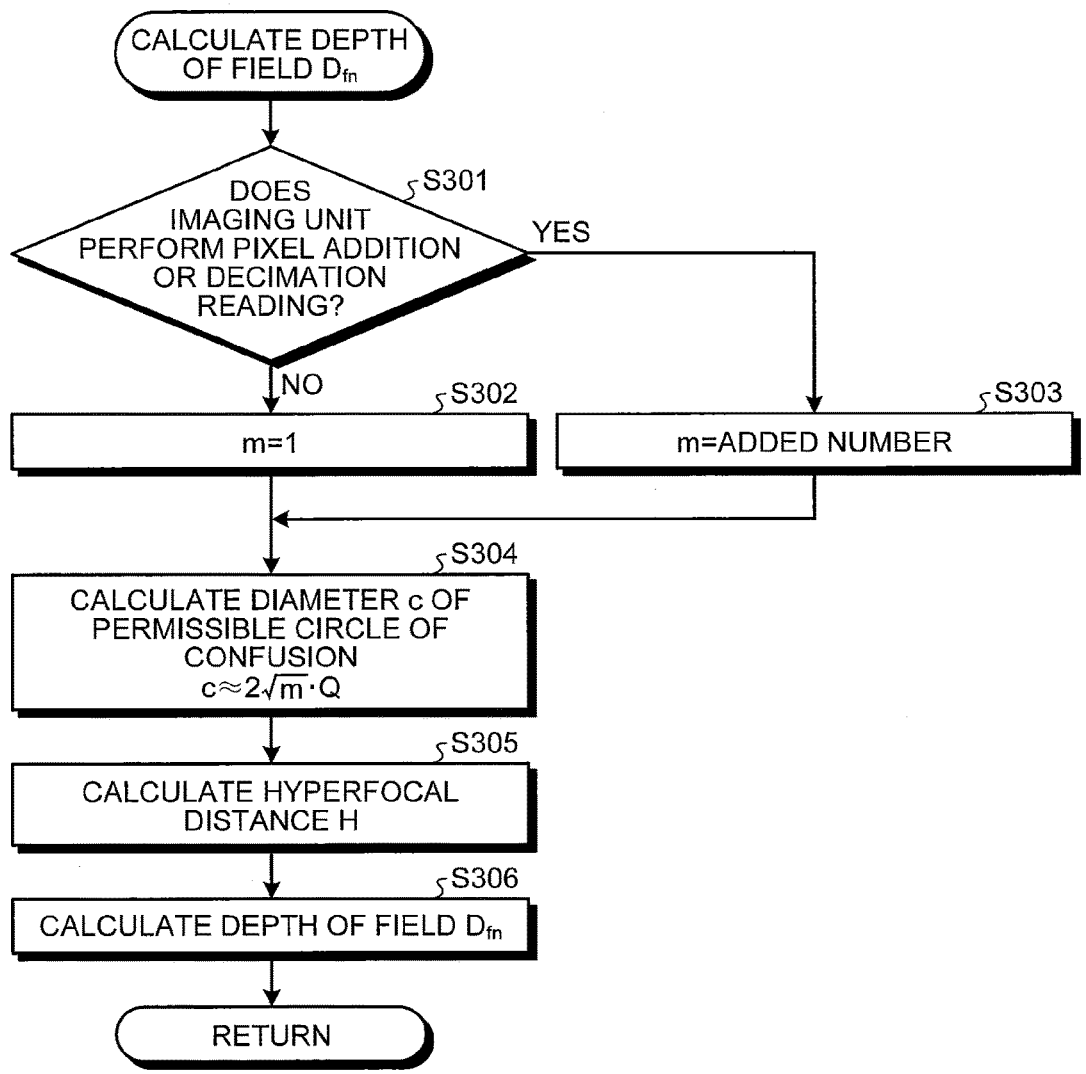
FIG. 14 is a flowchart illustrating a process for calculating the depth of field executed by a resolution setting unit.

Next, a process for calculating the depth of field $D_{fn}$ which is used when the resolution Rz is calculated in step S21 (refer to S212 of FIG. 11) will be described. FIG. 14 is a flowchart illustrating the process for calculating the depth of field $D_{fn}$ executed by the resolution setting unit 310.

When the imaging unit 110 images a moving image, the interval between frames is often defined by the resolution due to the processing capacity of the system. On the other hand, there is a trade-off relationship between the frame rate and the resolution due to the processing capacity of the system. Thus, when priority is given to the frame rate, that is, the capturing speed, the imaging unit 110 may perform a pixel addition or decimation reading process.

Figures 15, 16:
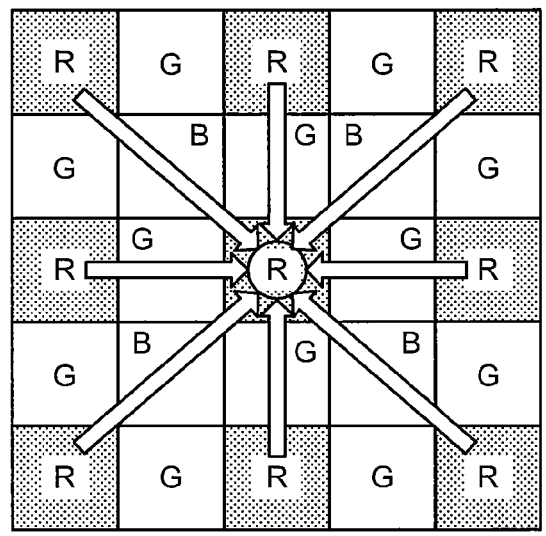
FIG. 15 is a schematic diagram describing a pixel addition process in an imager having a Bayer array.
FIG. 16 is a schematic diagram describing a decimation reading process in an imager having a Bayer array.
Figure 17:
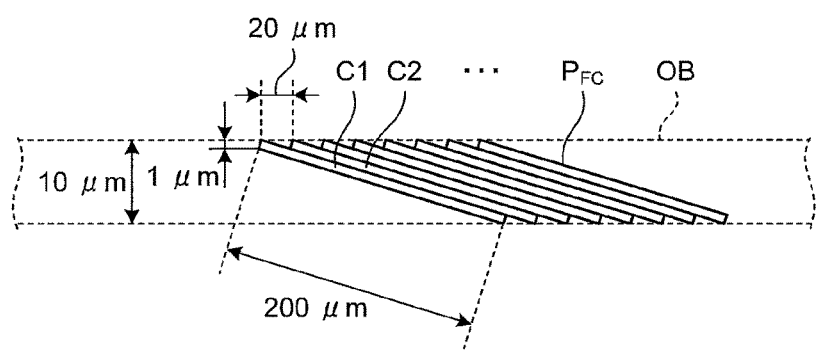
FIG. 17 is a schematic view describing an imaging operation when a focal plane is tilted in such a manner that the range in the Z direction is 10 μm.
Figure 18:
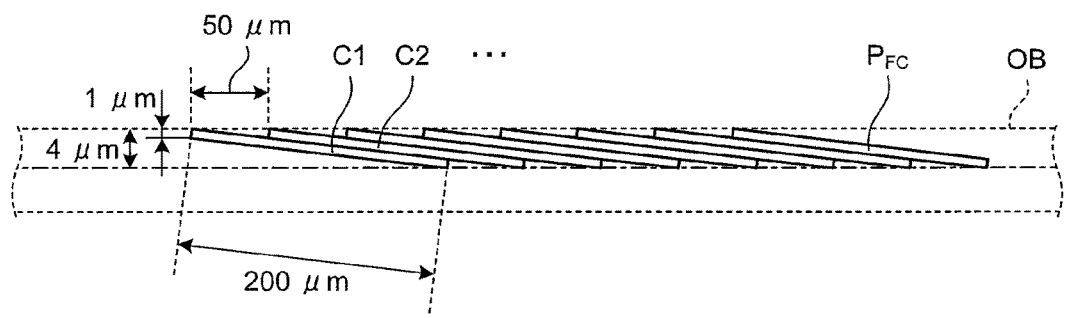
FIG. 18 is a schematic view describing an imaging operation when the focal plane is tilted in such a manner that the range in the Z direction is 4 μm.

For example, as illustrated in FIG. 15, when nine-pixel accumulation (a process for accumulating and averaging pixel values of nine pixels including one pixel and pixels therearound) is performed with respect to an imager having a Bayer array, the speed of reading pixel values is nine times the speed when reading pixel values of all pixels. On the other hand, as illustrated in FIG. 16, when decimation reading of once in three pixels is performed with respect to an imager having a Bayer array, the speed of reading pixel values is three times the speed when reading pixel values of all pixels. In FIG. 16, the pixels whose values are to be read are indicated by hatching. In these cases, the resolution is reduced depending on the number of pixels to be added or decimated. That is, the diameter c of the permissible circle of confusion representing the resolution between two points on the imaging surface 111a of the imager 111 increases.

So, in step S301, the pixel addition determination unit 311 first determines whether the imaging unit 110 performs pixel addition or decimation reading.

When the imaging unit 110 does not perform pixel addition or decimation reading (No in step S301), the resolution setting unit 310 sets a variable m in Equation (11) to satisfy m=1 (step S302), and approximately calculates the diameter c of the permissible circle of confusion (step S304).

$$c \approx 2\sqrt{m} \cdot Q \quad (11)$$

In Equation (11), "Q" denotes a pixel size per one pixel of the imager 111, and the diameter c of the permissible circle of confusion is twice the minimum pixel resolution size.

On the other hand, when the imaging unit 110 performs pixel addition or decimation reading (Yes in step S301), the resolution setting unit 310 sets the added number in the pixel addition (or the decimated number in the decimation reading) as the variable m in Equation (11) (step S303), and calculates the diameter c of the permissible circle of confusion (step S304). For example, in the nine-pixel addition illustrated in FIG. 15, m=9 is set. In the decimation reading illustrated in FIG. 16, m=3 is set.

In step S305 following thereafter, the resolution setting unit 310 calculates the hyperfocal distance H given by Equation (8) using the diameter c of the permissible circle of confusion calculated in step S304.

Further, in step S306, the resolution setting unit 310 calculates the depth of field $D_{fn}$ given by Equation (9-3) using the hyperfocal distance H calculated in step S305. Then, the process returns to a main routine.

As described above, in the third embodiment, a moving image is imaged while moving the stage 100. Thus, image information at a plurality of focal points related to the sample SP or three-dimensional image information based on a plurality of focusing information items can be acquired at high speed. Further, whether the imaging unit 110 performs pixel addition or decimation reading is determined and the resolution Rz in the Z direction is calculated on the basis of a result of the determination. Thus, the moving velocity of the sample SP can be appropriately set. Therefore, it is possible to sufficiently acquire three-dimensional image information related to the sample SP.

The first to third embodiments described above make it possible to acquire image information at a plurality of focal points of the sample SP at a higher speed and with a higher accuracy than conventional techniques. Therefore, the imaging unit 110 can generate images focused in the entire area within the observation range Lz without performing auto-focus at each imaging operation.

Further, using the three-dimensional image information of the sample SP based on a plurality of focusing information items also enables construction of a three-dimensional image of the sample SP. Further, as illustrated in FIG. 9, the imaging areas C1 and C2 are allowed to partially overlap each other in the XY plane to perform imaging. Thus, it is possible to acquire both a focused image and an unfocused image in the same XY coordinate, and thereby acquire blurring information. For example, deconvolution or focal point estimation can be performed using the blurring information.

The first to third embodiments and the modifications described above are not limited to as they are. Various inventions can be formed by appropriately combining a plurality of components disclosed in the embodiments and the modifications. For example, some components may be removed from all the components described in the embodiments. Alternatively, the components described in the different embodiments may be appropriately combined.

According to some embodiments, the tilt angle of the focal plane can be appropriately set by using at least the magnification of the imaging unit and the size of the effective area which is an area on the imaging surface into which observation light from an object is introduced. Therefore, it is possible to acquire image information of the entire object as an observation target including information in the thickness direction at a higher speed and with a higher accuracy than conventional techniques.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   a stage on which an object is configured to be placed;
   an imaging unit having an imager configured to image the object;
   a movement mechanism configured to perform a relative movement between the stage and the imaging unit in at least one direction within a placement plane for placing the object;
   a tilt mechanism configured to tilt at least one of an imaging surface of the imager and the stage relative to a moving direction of the movement mechanism;
   a tilt angle setting unit configured to set a tilt angle of the tilt mechanism based on at least a magnification of the imaging unit and a size of an effective area on the imaging surface, the effective area being an area into which observation light from the object is introduced;
   a moving velocity calculator configured to calculate a moving velocity by the movement mechanism; and
   a frame rate information acquiring unit configured to acquire information on a frame rate of a moving image imaged by the imaging unit,
   wherein the moving velocity calculator is configured to calculate velocity of relative movement caused by the movement mechanism using a resolution of the imaging unit in a second direction perpendicular to the placement plane, the tilt angle, and the information on the frame rate.

2. The imaging apparatus according to claim 1, further comprising a movement amount calculator configured to calculate a movement amount by the movement mechanism, wherein
   the imaging unit is configured to image the object at a specified imaging cycle, and
   the movement amount calculator is configured to calculate the amount of relative movement caused by the movement mechanism per one imaging cycle of the imaging unit in accordance with the tilt angle and a resolution of the imaging unit in a second direction perpendicular to the placement plane.

3. The imaging apparatus according to claim 2, wherein the resolution of the imaging unit in the second direction is given based on a numerical aperture of an optical system provided in the imaging unit, a wavelength of the observation light from the object, and a refractive index of a medium present between the optical system and the object.

4. The imaging apparatus according to claim 3, wherein the resolution is given by
$Rz=k_a \times DOF$, wherein
$DOF=(n\lambda)/(2 \times NA^2)$, where Rz denotes the resolution, $k_a$ denotes an arbitrary constant, DOF denotes a depth of field of the optical system, n denotes the refractive index, $\lambda$ denotes the wavelength of the observation light, and NA denotes the numerical aperture.

5. The imaging apparatus according to claim 2, wherein the resolution is given based on a size of a permissible circle of confusion on the imaging surface, a numerical aperture of an optical system provided in the imaging unit, a focal distance of the optical system, and an object distance as a distance between the optical system and the object.

6. The imaging apparatus according to claim 5, wherein the resolution is given by
$Rz=k_b \times D_{fn}$, wherein
$D_{fn}=\{2s(H-f)(s-f)\}/\{(H+s+2f)(H-s)\}$, and
$H=(2f^2 \times NA)/c$, where Rz denotes the resolution, $k_b$ denotes an arbitrary constant, $D_{fn}$ denotes a depth of field of the optical system, s denotes the object distance, H denotes a hyperfocal distance of the optical system, f denotes the focal distance, NA denotes the numerical aperture, and c denotes the size of the permissible circle of confusion.

7. The imaging apparatus according to claim 2, further comprising a switching unit configured to switch a method for obtaining the resolution of the imaging unit in the second direction based on a magnitude relationship between:
a first resolution of the imaging unit in the second direction given based on a diameter of a permissible circle of confusion on the imaging surface, a numerical aperture of an optical system provided in the imaging unit, a focal distance of the optical system, a distance between the object and the optical system, and an arbitrary first constant; and
a second resolution of the imaging unit in the second direction given based on the numerical aperture of the optical system, a wavelength of the observation light from the object, a refractive index of a medium present between the object and the optical system, and an arbitrary second constant.

8. The imaging apparatus according to claim 7, further comprising a constant input unit configured to input the first constant and the second constant.

9. The imaging apparatus according to claim 1, wherein the resolution of the imaging unit in the second direction is given based on a numerical aperture of an optical system provided in the imaging unit, a wavelength of the observation light from the object, and a refractive index of a medium present between the optical system and the object.

10. The imaging apparatus according to claim 9, wherein the resolution is given by
$k_a \times DOF$, wherein
$DOF=(n\lambda)/(2 \times NA^2)$, where Rz denotes the resolution, $k_a$ denotes an arbitrary constant, DOF denotes a depth of field of the optical system, n denotes the refractive index, $\lambda$ denotes the wavelength of the observation light, and NA denotes the numerical aperture.

11. The imaging apparatus according to claim 1, wherein the resolution is given based on a size of a permissible circle of confusion on the imaging surface, a numerical aperture of an optical system provided in the imaging unit, a focal distance of the optical system, and an object distance as a distance between the optical system and the object.

12. The imaging apparatus according to claim 11, wherein the resolution is given by
$Rz=k_b \times D_{fn}$, wherein
$D_{fn}=\{2s(H-f)(s-f)\}/\{(H+s+2f)(H-s)\}$, and
$H=(2f^2 \times NA)/c$, where Rz denotes the resolution, $k_b$ denotes an arbitrary constant, $D_{fn}$ denotes a depth of field of the optical system, s denotes the object distance, H denotes a hyperfocal distance of the optical system, f denotes the focal distance, NA denotes the numerical aperture, and c denotes the size of the permissible circle of confusion.

13. The imaging apparatus according to claim 1, further comprising a switching unit configured to switch a method for obtaining the resolution of the imaging unit in the second direction based on a magnitude relationship between:
a first resolution of the imaging unit in the second direction given based on a diameter of a permissible circle of confusion on the imaging surface, a numerical aperture of an optical system provided in the imaging unit, a focal distance of the optical system, a distance between the object and the optical system, and an arbitrary first constant; and
a second resolution of the imaging unit in the second direction given based on the numerical aperture of the optical system, a wavelength of the observation light from the object, a refractive index of a medium present between the object and the optical system, and an arbitrary second constant.

14. The imaging apparatus according to claim 13, further comprising a constant input unit configured to input the first constant and the second constant.

15. The imaging apparatus according to claim 1, wherein the tilt mechanism is configured to tilt an optical axis of the imaging unit with respect to an axis perpendicular to the placement plane.

16. The imaging apparatus according to claim 1, wherein the tilt mechanism is configured to tilt a surface into which the imaging unit introduces the observation light from the object, with respect to an optical axis of the imaging unit.

17. A microscope system comprising:
the imaging apparatus according to claim 1; and
an illumination unit configured to illuminate the object.

18. The microscope system according to claim 17, wherein the object is a sliced specimen obtained by slicing a pathological tissue.

* * * * *